H. F. GRAHAM AND H. HAYNES.
AUTOMOBILE HEADLIGHT.
APPLICATION FILED JAN. 19, 1921.
1,432,458. Patented Oct. 17, 1922.
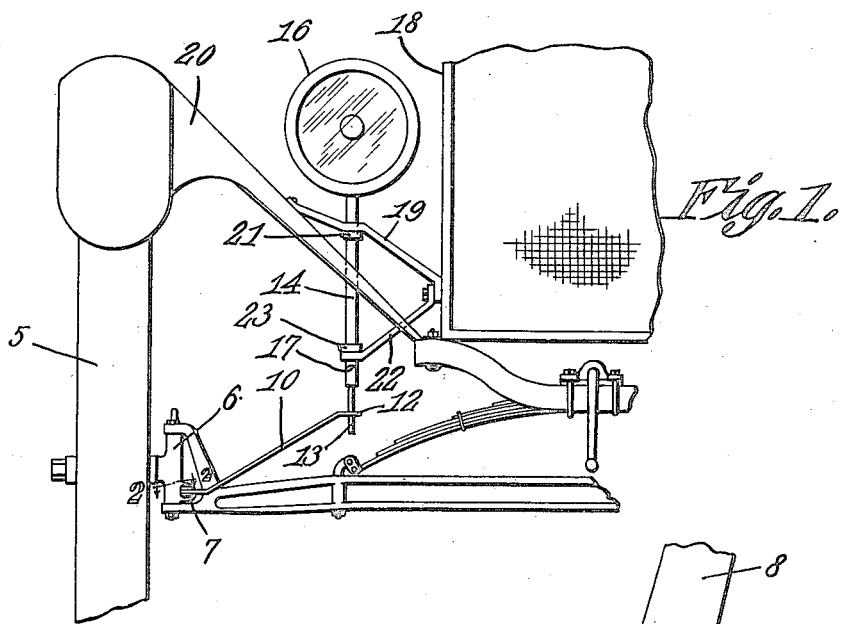
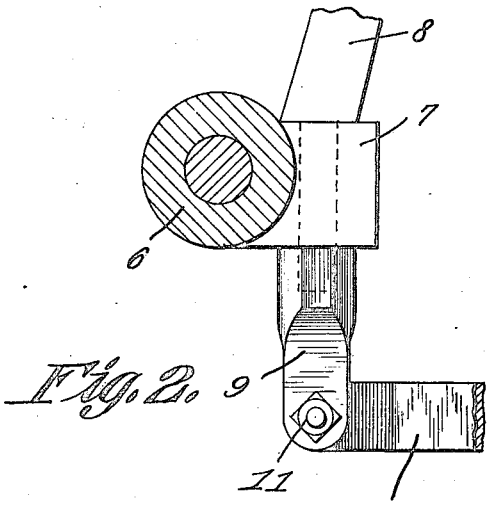
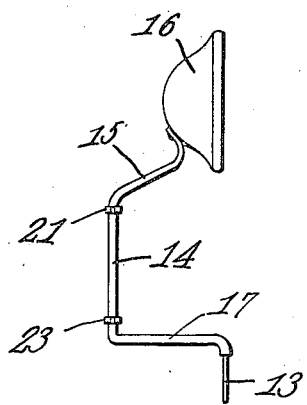
H. F. Graham
and H. Haynes,
Inventors Patented Oct. 17, 1922.

1,432,458

UNITED STATES PATENT OFFICE.

HENRY FRANK GRAHAM AND HOWARD HAYNES, OF FARMINGTON, MISSOURI.

AUTOMOBILE HEADLIGHT.

Application filed January 19, 1921. Serial No. 438,410.

*To all whom it may concern:*

Be it known that we, HENRY FRANK GRAHAM and HOWARD HAYNES, citizens of the United States, residing at Farmington, in the county of St. Francois, State of Missouri, have invented a new and useful Automobile Headlight, of which the following is a specification.

This invention relates to automobile headlights, and more particularly to headlights of the dirigible type, and the primary object of the invention is to provide a headlight which will readily move with the front wheels of a vehicle to illuminate the path of travel of the machine.

A further object of the invention is to provide a device of this character which may be readily and easily secured to the automobile chassis now in use, eliminating the necessity of making elaborate changes in the structure, to accomplish the positioning of the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a fragmental front elevational view of a vehicle showing a lamp constructed in accordance with the present invention, as applied thereto.

Figure 2 is a sectional view taken on line 2—2 of Figure 1.

Figure 3 is a detail view of one of the lamp brackets.

Referring to the drawing in detail, the reference character 5 designates the front wheel of a motor vehicle which is supplied with the usual stud axle 6 having a laterally extending ear 7 which is apertured to receive the reduced end of the steering knuckle 8, the reduced portion extending through the ear where the same receives a nut, by means of which the steering knuckle is secured to the stub axle 6.

In the present showing, the nut referred to is replaced by the socket member 9 which forms a part of the invention, the socket member acting as a nut for securing the steering knuckle 8 and at the same time providing means for transmitting motion of the stub axle 6 to the lamp operating means which includes a bar 10.

This bar 10 is formed preferably of flexible metal, and has one end thereof bolted to the socket member 9 as at 11, the connection between the socket member 9 and bar 10 being such as to permit of pivotal movement of the bar 10 with respect to the socket member 9.

As shown, the bar 10 extends upwardly and is provided with a horizontal portion 12 which is apertured to accommodate the downwardly extending arm 13 of the lamp supporting arm 14, which arm is provided with an angular portion 15 that has connection with the lamp proper 16.

The lower portion of the arm 14 extends at an angle as indicated at 17, and since the arm is supported at a point adjacent to the angular portion 17, the movement of the downwardly extending arm causes the operation of the lamp supporting arm 14 with the result that the lamp 16 is correspondingly moved.

Having connection with the radiator frame 18 of the motor vehicle, is a bracket member 19 which is bolted to the fender 20 to secure the bracket member against movement, the bracket member being apertured to accommodate the arm 14, there being provided a washer 21 as secured to the arm 14, to restrict vertical movement of the arm 14, through the bracket member.

The arm 14 also passes through a suitable opening in the fender 20 and has its lower portion supported by the arm 22 forming a part of the bracket, a washer 23 being secured to the arm 14 at a point adjacent to the arm 22, to further insure against vertical movement of the lamp arm 14.

The reduced portion 13 of the arm is relatively long to compensate for the movement between the chassis of the vehicle and the running gear thereof, it being understood that as the upper portion or chassis of the vehicle moves, the reduced portion 13 will move through the opening in the arm 10.

From the foregoing it is obvious that as the stub axle 6 is moved to accomplish the steering of the vehicle, the arm 10 is correspondingly moved, which imparts a relative movement to the lamp supporting element 15, to pivot the lamp 16 according to the turn of the wheel 5.

It might be further stated that due to the fact that the arm 10 is formed of flexible material, the arm may be forced downwardly to disconnect the arm and lamp supporting arm 14, whereupon the lamp 16 may be rotated to illuminate the engine or other parts of the vehicle, to accomplish the repairing thereof.

Having thus described the invention, what is claimed as new is:—

In combination with the stub axles of a motor vehicle, bracket members, lamp supporting arms supported within the bracket members, each of the lamp supporting arms including a right angled lower end portion terminating in a downwardly extended arm, an angular lamp engaging arm formed at the upper end of each supporting arm, a bar having an opening to accommodate the downwardly extended arm, a socket member having pivoted connection with the bar, and said socket member having connection with the stub axle associated therewith.

In testimony that we claim the foregoing as our own, we have hereto affixed our signatures in the presence of two witnesses.

HENRY FRANK GRAHAM.
HOWARD HAYNES.

Witnesses:
J. P. ZOLMAN,
RUTH GARNER.